(12) United States Patent
Zohar et al.

(10) Patent No.: US 7,603,580 B2
(45) Date of Patent: Oct. 13, 2009

(54) REDUNDANT MANAGER FOR A STORAGE SYSTEM

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 10/886,359

(22) Filed: Jul. 7, 2004

(65) Prior Publication Data

US 2005/0015658 A1   Jan. 20, 2005

Related U.S. Application Data

(63) Continuation-in-part of application No. 10/620,080, filed on Jul. 15, 2003, and a continuation-in-part of application No. 10/620,249, filed on Jul. 15, 2003, now Pat. No. 7,293,156.

(51) Int. Cl.
*G06F 11/00* (2006.01)

(52) U.S. Cl. ............... 714/6; 714/5; 714/8; 714/11; 714/13

(58) Field of Classification Search .......... 714/4, 714/5, 6, 11, 13, 42, 7, 8, 10
See application file for complete search history.

(56) References Cited

U.S. PATENT DOCUMENTS

| | | | | |
|---|---|---|---|---|
| 5,455,934 A * | 10/1995 | Holland et al. | ............ | 714/6 |
| 5,699,510 A * | 12/1997 | Petersen et al. | ............ | 714/6 |
| 5,774,643 A * | 6/1998 | Lubbers et al. | ............ | 714/20 |
| 6,477,139 B1 * | 11/2002 | Anderson et al. | ............ | 714/6 |
| 6,675,258 B1 * | 1/2004 | Bramhall et al. | ............ | 711/114 |
| 6,732,289 B1 * | 5/2004 | Talagala et al. | ............ | 714/6 |
| 6,802,023 B2 * | 10/2004 | Oldfield et al. | ............ | 714/4 |
| 6,952,792 B2 * | 10/2005 | Emberty et al. | ............ | 714/6 |
| 7,027,053 B2 * | 4/2006 | Berndt et al. | ............ | 714/6 |
| 7,043,663 B1 * | 5/2006 | Pittelkow et al. | ............ | 714/6 |
| 2002/0184360 A1 * | 12/2002 | Weber et al. | ............ | 709/223 |
| 2003/0070043 A1 * | 4/2003 | Merkey | ............ | 711/114 |
| 2004/0049710 A1 * | 3/2004 | Ashmore et al. | ............ | 714/5 |

* cited by examiner

*Primary Examiner*—Robert Beausoliel
*Assistant Examiner*—Joseph D Manoskey
(74) *Attorney, Agent, or Firm*—Griffiths & Seaton PLLC (57) ABSTRACT

A method for managing activity of a data storage system, including at least partly managing and performing an operator interaction with the storage system using a first processing system, and monitoring operation of the first processing system using a second processing system. The method further includes detecting a failure in operation of the first processing system using the second processing system and at least partly managing and performing the operator interaction using the second processing system in response to detecting the failure.

18 Claims, 8 Drawing Sheets

REDUNDANT MANAGER FOR A STORAGE SYSTEM

RELATED APPLICATIONS

This application is a continuation-in-part of application Ser. No. 10/620,080, titled "Data Allocation in a Distributed Storage System," and of application Ser. No. 10/620,249, titled "Distributed Independent Cache Memory," both filed 15 Jul. 2003, which are incorporated herein by reference.

FIELD OF THE INVENTION

The present invention relates generally to computer management, and specifically to management of a storage system.

BACKGROUND OF THE INVENTION

As data storage systems increase in size and complexity, the need for the systems to be protected against failure becomes more critical. Typical protection against failure, as is known in the art, consists of incorporating redundancy into input/output (I/O) operations. For example, a first and a second processing unit within a storage system may be configured to perform a write operation. If the write operation is performed by the first processing unit, but the operation fails to complete successfully, the second processing unit may be configured to automatically take over the operation. The second processing unit then completes the operation, and may be configured to automatically continue to operate in place of the first processing unit. A storage system is typically configured to perform its I/O operations without interaction between the system and an operator of the system.

SUMMARY OF THE INVENTION

In embodiments of the present invention, an operator interaction with a storage system is managed and implemented in a redundant manner. To achieve the redundancy, first and second processing systems of the system are both configured to be able to manage and at least partly perform the operator interaction. The first processing system operates to manage and at least partly perform the interaction, and the second processing system monitors the operation of the first system. On detection of a failure in operation of the first processing system, the second processing system manages and at least partly performs the interaction.

Typically, a multiplicity of operator interactions occur in the storage system. Each of the multiplicity of interactions is redundantly managed and at least partly performed by respective pairs of processing systems, so that a failure of any one of the systems causes the other processing system of the pair to be activated. Incorporating redundancy into the management and performance of operator interactions improves the robustness of the storage system.

In some embodiments of the present invention, each processing system comprises a respective processing unit coupled to a memory. The memory stores software which the processing unit reads to manage and at least partly perform the operator interactions. In some embodiments, some of the processing systems have common processing units and/or memories, the common units and/or memories being implemented so as to maintain complete redundancy for each operator interaction.

In some embodiments of the present invention, at least one additional processing system is able to manage and at least partly perform the operator interaction. On failure of the first processing system so that the second processing system activates, one of the additional processing systems activates to monitor the second processing system, and replaces the second system in the event of the latter failing.

There is therefore provided, according to an embodiment of the present invention, a method for managing activity of a data storage system, including:

at least partly managing and performing an operator interaction with the storage system using a first processing system;

monitoring operation of the first processing system using a second processing system;

detecting a failure in operation of the first processing system using the second processing system; and at least partly managing and performing the operator interaction using the second processing system in response to detecting the failure.

At least partly managing and performing the operator interaction typically includes performing an action wherein a response from the operator is intended.

In an embodiment, the method includes managing an input/output activity of the data storage system.

In an alternative embodiment, the method includes at least partly de-activating the first processing system, in response to detecting the failure.

In an embodiment, the operator interaction may include at least one activity chosen from booting the data storage system and shutting down the system; at least one activity chosen from defining, modifying, and removing one of a software and a hardware element of the data storage system; at least one activity chosen from reacting to and initiating a modification of a configuration of the data storage system; and/or at least one activity chosen from changing a graphic user interface and an administration element of the data storage system.

In an alternative embodiment, the method includes:

the second processing system at least partly managing and performing the operator interaction;

the first processing system monitoring the operation of the second processing system;

detecting a failure in operation of the second processing system using the first processing system; and the first processing system at least partly managing and performing the operator interaction in response to detecting the failure.

In a further alternative embodiment, the first processing system includes a first processing unit communicating with a first memory and the second processing system includes a second processing unit communicating with a second memory. In yet another embodiment, the method includes a third processing system which at least partly manages and performs a further operator interaction with the storage system, wherein the third processing system includes the second processing unit communicating with a third memory.

The third processing system may at least partly manage and perform a further operator interaction with the storage system, wherein the third processing system includes a third processing unit communicating with the second memory. The second processing system may at least partly manage and perform a further operator interaction with the storage system.

In an embodiment, in at least partly managing and performing the operator interaction includes completely managing the operator interaction.

There is further provided, according to an embodiment of the present invention, apparatus for redundantly managing activity of a data storage system, including:

a first processing system which is adapted to at least partly manage and perform an operator interaction with the storage system; and a second processing system which is adapted to monitor the first processing system, and in response to detecting a failure in operation of the first processing system, to at least partly manage and perform the operator interaction.

In an embodiment, the apparatus further includes:

the second processing system at least partly managing and performing the operator interaction;

the first processing system monitoring the operation of the second processing system;

the first processing system detecting a failure in operation of the second processing system; and the first processing system at least partly managing and performing the operator interaction in response to detecting the failure.

In an alternative embodiment, the first processing system includes a first processing unit communicating with a first memory and the second processing system includes a second processing unit communicating with a second memory.

There is further provided, according to an embodiment of the present invention, a method for managing activity of a data storage system, including:

at least partly managing and performing an autonomous activity of the storage system using a first processing system;

monitoring operation of the first processing system using a second processing system;

detecting a failure in operation of the first processing system using the second processing system; and at least partly managing and performing the autonomous activity using the second processing system in response to detecting the failure.

In an embodiment the storage system is operative according to a protocol, and the autonomous activity is unrelated to the protocol.

Typically, the autonomous activity includes at least one activity chosen from automatic shut-down of the data storage system, automatic re-configuration of a topology of the data storage system, periodic monitoring of parameters to be sent to an operator of the data storage system, and scheduling a launch of backup activity of the system.

There is further provided, according to an embodiment of the present invention, apparatus for managing activity of a data storage system, including:

a first processing system which is adapted to at least partly manage and perform an autonomous activity of the storage system; and a second processing system which is adapted to monitor the first processing system, and in response to detecting a failure in operation of the first processing system, to at least partly manage and perform the autonomous activity.

The present invention will be more fully understood from the following detailed description of the preferred embodiments thereof, taken together with the drawings, a brief description of which is given below.

DETAILED DESCRIPTION OF PREFERRED EMBODIMENTS

Figure 1:
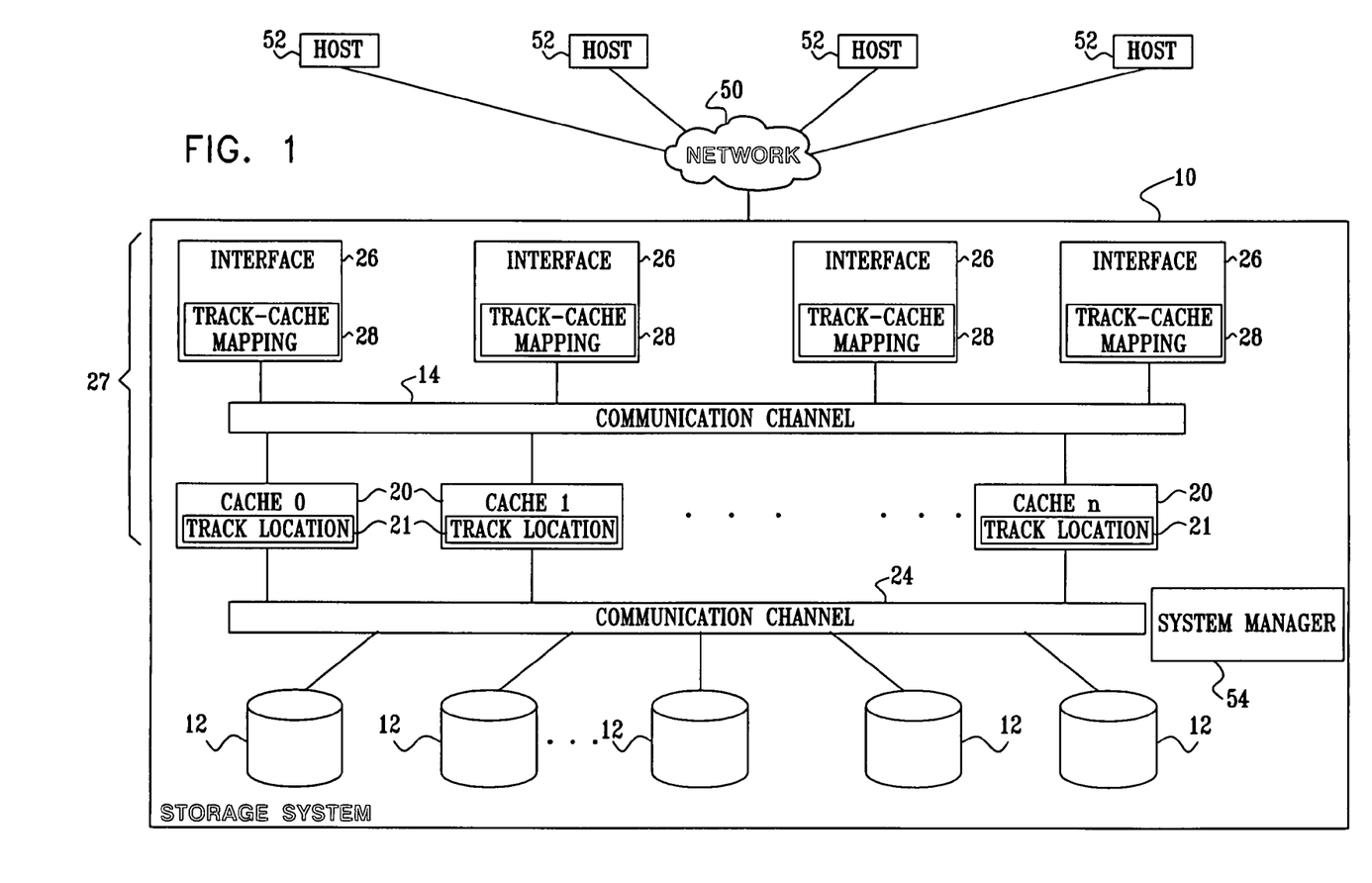
FIG. 1 is a schematic block diagram of a data storage system, according to an embodiment of the present invention.

Reference is now made to FIG. 1, which is a schematic block diagram of a storage system 10, according to an embodiment of the present invention. System 10 acts as a data memory for one or more host processors 52, which are coupled to the storage system by any means known in the art, for example, via a network such as the Internet or by a bus. Herein, by way of example, hosts 52 and system 10 are assumed to be coupled by a network 50. The data stored within system 10 is stored at logical addresses (LAs) in one or more slow access time mass storage units, hereinbelow assumed to be one or more disks 12, by way of example, unless otherwise stated. A system manager 54 allocates the LAs and also acts as a central control unit for system 10.

System 10 is typically installed as part of a network attached storage (NAS) system, or as part of a storage area network (SAN) system, data and/or file transfer between system 10 and hosts 52 being implemented according to the protocol required by the type of system. For example, if system 10 is operative in a NAS system, data transfer is typically file based, using an Ethernet protocol; if system 10 is operative in a SAN system, data transfer is typically small computer system interface (SCSI) block based, using a fibre channel protocol. In a SAN system, LAs are typically grouped into logical units (LUs), allocated by manager 54. It will be appreciated, however, that embodiments of the present invention are not limited to any specific type of data transfer method or protocol.

System 10 comprises one or more substantially similar interfaces 26 which receive input/output (IO) access requests for data in disks 12 from hosts 52. Each interface 26 may be implemented in hardware and/or software, and may be located in storage system 10 or alternatively in any other suitable location, such as an element of network 50 or one of host processors 52. Between disks 12 and the interfaces are a second plurality of interim caches 20, each cache comprising memory having fast access time, and each cache being at an equal level hierarchically. Each cache 20 typically comprises random access memory (RAM), such as dynamic RAM, and may also comprise software. Caches 20 are coupled to interfaces 26 by any suitable fast coupling system known in the art, such as a bus or a switch, so that each interface is able to communicate with, and transfer data to and from, any cache. Herein the coupling between caches 20 and interfaces 26 is assumed, by way of example, to be by a first cross-point switch 14. Interfaces 26 operate substantially independently of each other. Caches 20 and interfaces 26 operate as a data transfer system 27, transferring data between hosts 52 and disks 12.

Caches 20 are typically coupled to disks 12 by a fast coupling system. The coupling between the caches and the disks may be by a "second plurality of caches to first plurality of disks" coupling, herein termed an "all-to-all" coupling, such as a second cross-point switch 24. Alternatively, one or more subsets of the caches may be coupled to one or more subsets of the disks. Further alternatively, the coupling may be by a "one-cache-to-one-disk" coupling, herein termed a "one-to-one" coupling, so that one cache communicates with one disk. The coupling may also be configured as a combination of any of these types of coupling. Disks 12 operate substantially independently of each other.

At setup of system 10 system manager 54 assigns a range of LAs to each cache 20. Manager 54 may subsequently reassign the ranges during operation of system, and an example of steps to be taken in the event of a change is described below with reference to FIG. 5. The ranges are chosen so that the complete memory address space of disks 12 is covered, and so that each LA is mapped to at least one cache; typically more than one is used for redundancy purposes. The LAs are typically grouped by an internal unit termed a "track," which is a group of sequential LAs, and which is described in more detail below. The assigned ranges for each cache 20 are typically stored in each interface 26 as a substantially similar table, and the table is used by the interfaces in routing IO requests from hosts 52 to the caches. Alternatively or additionally, the assigned ranges for each cache 20 are stored in each interface 26 as a substantially similar function, or by any other suitable method known in the art for generating a correspondence between ranges and caches. Hereinbelow, the correspondence between caches and ranges, in terms of tracks, is referred to as track-cache mapping 28, and it will be understood that mapping 28 gives each interface 26 a general overview of the complete cache address space of system 10.

In arrangements of system 10 comprising an all-to-all configuration, each cache 20 contains a track location table 21 specific to the cache. Each track location table 21 gives its respective cache exact location details, on disks 12, for tracks of the range assigned to the cache. Track location table 21 may be implemented as software, hardware, or a combination of software and hardware. The operations of track location table 21, and also of mapping 28, are explained in more detail below.

Figure 2:
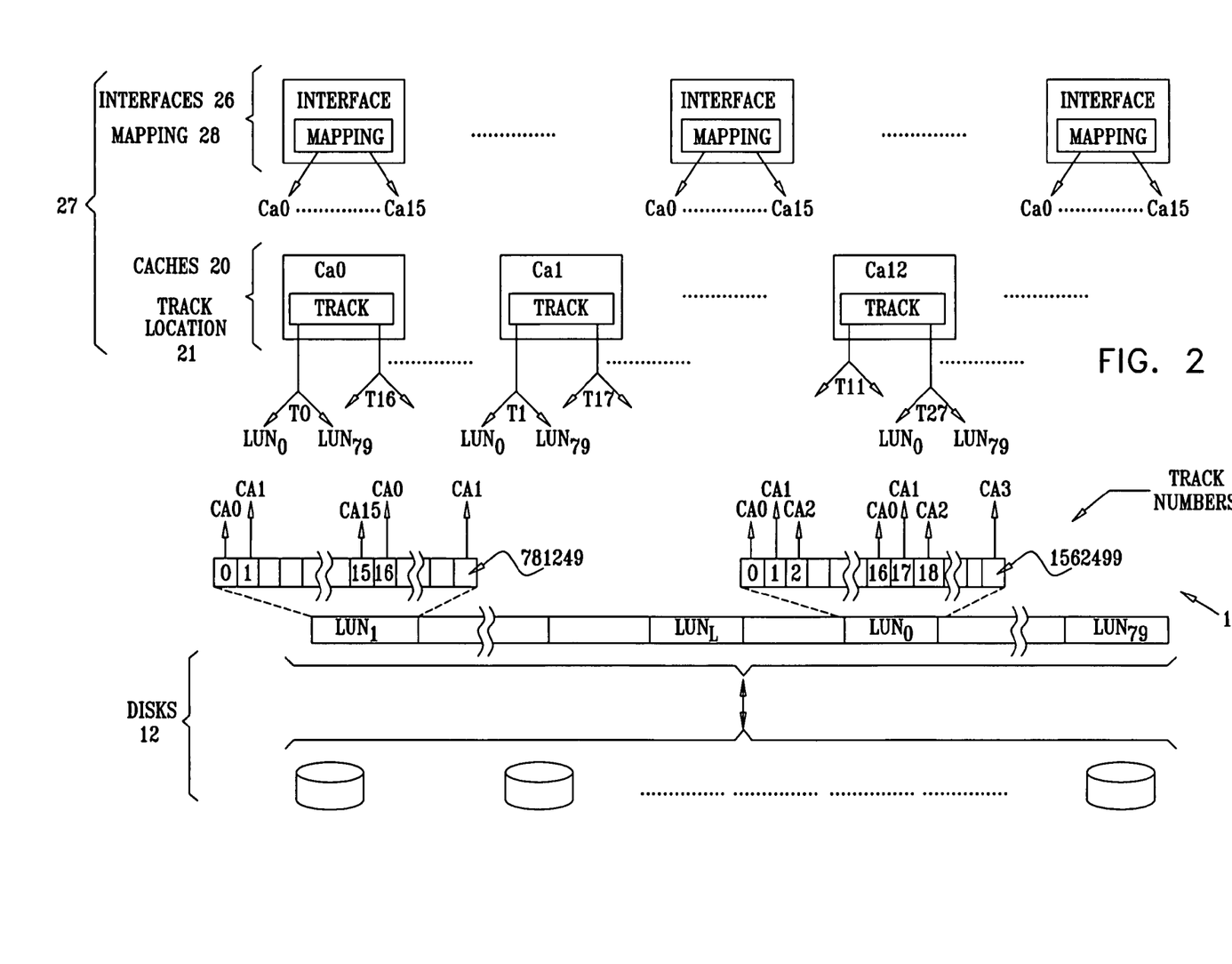
FIG. 2 is a schematic diagram illustrating a mapping of data between different elements of the system of FIG. 1 for an "all-caches-to-all-disks" configuration, according to an embodiment of the present invention.

FIG. 2 is a schematic diagram illustrating a mapping of data between different elements of system 10 when the system comprises an all-to-all configuration 11, according to an embodiment of the present invention. It will be appreciated that host processors 52 may communicate with storage system 10 using virtually any communication system known in the art. By way of example, hereinbelow it is assumed that the hosts communicate with system 10, via network 50, according to an Internet Small Computer System Interface (iSCSI) protocol, wherein blocks of size 512 bytes are transferred between the hosts and the system. The internal unit of data, i.e., the track, is defined by system manager 54 for system 10, and is herein assumed to have a size of 128 iSCSI blocks, i.e., 64 KB, although it will be appreciated that substantially any other convenient size of track may be used to group the data.

Also by way of example, system 10 is assumed to comprise 16 caches 20, herein termed Ca0, Ca1, ..., Ca14, Ca15, and 32 generally similar disks 12, each disk having a 250 GB storage capacity, for a total disk storage of 8 TB. It will be understood that there is no requirement that disks 12 have equal capacities, and that the capacities of disks 12 have substantially no effect on the performance of caches 20. The 32 disks are assumed to be partitioned into generally similar LUs, $LU_L$, where L is an identifying LU integer from 0 to 79. The LUs include $LU_0$ having a capacity of 100 GB. Each LU is sub-divided into tracks, so that $LU_0$ comprises $$\frac{100 \text{ GB}}{64 \text{ KB}}$$

tracks i.e., 1,562,500 tracks, herein termed Tr0, Tr1, ..., Tr1562498, Tr1562499. (Typically, as is described further below, the LAs for any particular LU may be spread over a number of disks 12, to achieve well-balanced loading for the disks.)

In system 10, each track of $LU_0$ is assigned to a cache according to the following general mapping:

$$Tr(n) \rightarrow Ca(n \bmod 16) \quad (1)$$

where n is the track number.

Mapping (1) generates the following specific mappings between tracks and caches:

$$Tr(0) \rightarrow Ca(0)$$

$$Tr(1) \rightarrow Ca(1)$$

M $$Tr(15) \rightarrow Ca(15)$$

$$Tr(16) \rightarrow Ca(0)$$

$$Tr(17) \rightarrow Ca(1)$$

M $$Tr(1562498) \rightarrow Ca(2)$$

$$Tr(1562499) \rightarrow Ca(3) \quad (2)$$

A similar mapping for each LU comprising disks 12 may be generated. For example, an $LU_1$ having a capacity of 50 GB is sub-divided into 781,250 tracks, and each track of $LU_1$ is assigned the following specific mappings:

$$Tr(0) \rightarrow Ca(0)$$

$$Tr(1) \rightarrow Ca(1)$$

M $$Tr(15) \rightarrow Ca(15)$$

$$Tr(16) \rightarrow Ca(0)$$

$$Tr(17) \rightarrow Ca(1)$$

M $$Tr(781248) \rightarrow Ca(0)$$

$$Tr(781249) \rightarrow Ca(1) \quad (3)$$

Inspection of mappings (2) and (3) shows that the tracks of $LU_0$ and of $LU_1$ are substantially evenly mapped to cache s 20. In general, for any $LU_L$, a general mapping for every track in disks 12 is given by:

$$Tr(L,n) \rightarrow Ca(n \bmod 16) \quad (4)$$

the track number of $LU_L$.

It will be appreciated that mapping (4) is substantially equivalent to a look-up table, such as Table I below, that assigns specific tracks to specific caches, and that such a look-up table may be stored in each interface in place of the mapping.

TABLE I

| | Track | |
|---|---|---|
| L (LU identifier) | n (Track number) | Cache (0-15) |
| 0 | 0 | 0 |
| 0 | 1 | 1 |
| 0 | 2 | 2 |
| 0 | 3 | 3 |
| 0 | 4 | 4 |
| . | . | . |
| . | . | . |
| . | . | . |
| 0 | 15 | 15 |
| 0 | 16 | 0 |
| . | . | . |
| . | . | . |
| . | . | . |
| 0 | 1562498 | 2 |
| 0 | 1562499 | 3 |
| 1 | 0 | 0 |
| 1 | 1 | 1 |
| . | . | . |
| . | . | . |
| . | . | . |
| 1 | 17 | 1 |
| . | . | . |
| . | . | . |
| . | . | . |
| 1 | 781249 | 1 |
| . | . | . |
| . | . | . |
| . | . | . |

Mapping (4) and Table I are examples of corresponding that assign each track comprised in disks 12 to a specific cache. Other examples of such assignments will be apparent to those skilled in the art. While such assignments may always be defined in terms of a look-up table such as Table I, it will be appreciated that any particular assignment may not be defined by a simple function such as mapping (4). For example, an embodiment of the present invention comprises a Table II where each track of each LU is assigned by randomly or pseudo-randomly choosing a cache between 0 and 15.

TABLE II

| | Track | |
|---|---|---|
| L (LU identifier) | n (Track number) | Cache (0-15) |
| 0 | 0 | 11 |
| 0 | 1 | 0 |
| . | . | . |
| . | . | . |
| . | . | . |
| 0 | 15 | 12 |
| 0 | 16 | 2 |
| . | . | . |
| . | . | . |
| . | . | . |
| 0 | 1562498 | 14 |
| 0 | 1562499 | 13 |
| 1 | 0 | 7 |
| 1 | 1 | 5 |
| . | . | . |

TABLE II-continued

| | Track | |
|---|---|---|
| L (LU identifier) | n (Track number) | Cache (0-15) |
| . | . | . |
| . | . | . |
| . | . | . |
| 1 | 17 | 12 |
| . | . | . |
| . | . | . |
| . | . | . |
| 1 | 781249 | 15 |
| . | . | . |
| . | . | . |
| . | . | . |

Configurations of system 10 that include an all-to-all configuration such as configuration 11 include track location table 21 in each cache 20 of the all-to-all configuration. Track location table 21 is used by the cache to determine an exact disk location of a requested LU and track. Table III below is an example of track location table 21 for cache Ca7, assuming that mapping 28 corresponds to Table I. In Table III, the values a, b, . . . , f, . . . of the disk locations of the tracks, are allocated by system manager 54.

TABLE III

| Cache Ca7 | | |
|---|---|---|
| | Track | |
| L (LU identifier) | n (Track number) | Disk Location |
| 0 | 7 | a |
| 0 | 23 | b |
| . | . | . |
| . | . | . |
| . | . | . |
| 0 | 1562487 | c |
| 1 | 7 | d |
| 1 | 23 | e |
| . | . | . |
| . | . | . |
| . | . | . |
| 1 | 1562487 | f |
| . | . | . |
| . | . | . |
| . | . | . |

Figure 3:
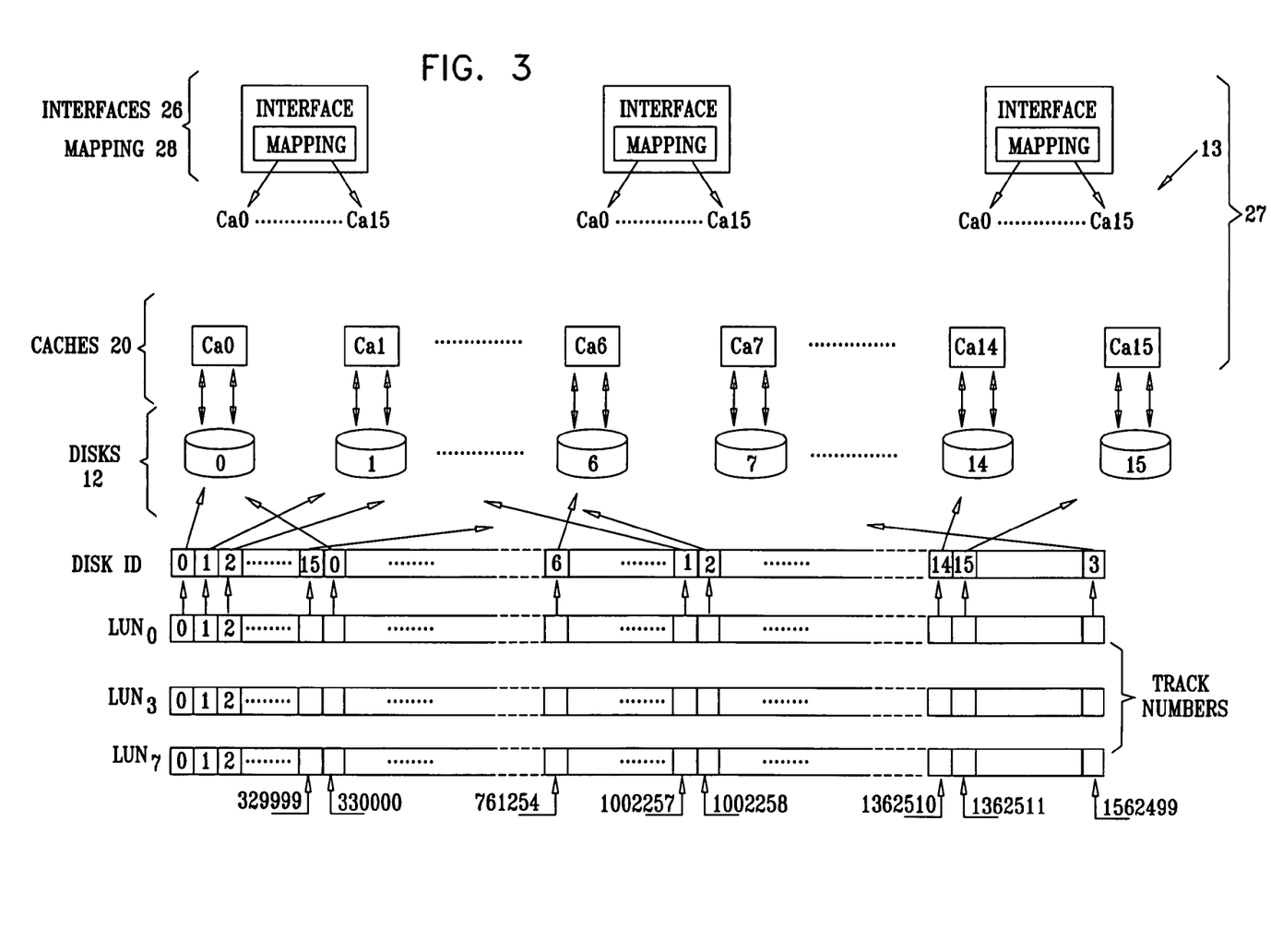
FIG. 3 is a schematic diagram illustrating a mapping of data between different elements of the system of FIG. 1 for a "one-cache-to-one-disk" configuration, according to an embodiment of the present invention.

FIG. 3 is a schematic diagram illustrating a mapping of data between different elements of system 10 when the system comprises a one-to-one configuration 13, according to an embodiment of the present invention. In one-to-one configuration 13, tracks are assigned to caches on the basis of the disks wherein the tracks originate. FIG. 3, and Table IV below, shows an example of tracks so assigned. For the assignment of each track of system 10 defined by Table IV, there are assumed to be 16 generally similar disks 12, each disk having a whole number disk identifier D ranging from 0 to 15 and 50 GB capacity, and each disk is assigned a cache. There are also assumed to be 8 LUs $LU_L$, where L is an integer from 0 to 7, of 100 GB evenly divided between the disks, according to mapping (5):

$$Tr(L,n) \rightarrow Disk(n \bmod 16) = Ca(n \bmod 16) \qquad (5)$$

TABLE IV

| L (LU identifier) | Track n (Track number) | D (Disk identifier) (0-15) | Cache (0-15) |
|---|---|---|---|
| 0-7 | 0 | 0 | 0 |
|  | 1 | 1 | 1 |
|  | 2 | 2 | 2 |
|  | . | . | . |
|  | . | . | . |
|  | . | . | . |
|  | 329999 | 15 | 15 |
|  | 330000 | 0 | 0 |
|  | . | . | . |
|  | . | . | . |
|  | . | . | . |
|  | 761254 | 6 | 6 |
|  | . | . | . |
|  | . | . | . |
|  | . | . | . |
|  | 1002257 | 1 | 1 |
|  | 1002258 | 2 | 2 |
|  | . | . | . |
|  | . | . | . |
|  | . | . | . |
|  | 1562499 | 3 | 3 |

A mapping such as mapping (4) or mapping (5), or a table such as Table I, II, or IV, or a combination of such types of mapping and tables, is incorporated into each interface 26 as its track-cache mapping 28, and spreads the LAs of the LUs substantially evenly across caches 20. The mapping used is a function of the coupling arrangement between caches 20 and disks 12. Track-cache mapping 28 is used by the interfaces to process IO requests from hosts 52, as is explained with respect to FIG. 5 below. The application titled "Data Allocation in a Distributed Storage System," describes a system for mapping LAs to devices such as caches 20 and/or disks 12, and such a system is preferably used for generating track-cache mapping 28.

To achieve well-balanced loading across caches 20, system 10 generates even and sufficiently fine "spreading" of all the LAs over the caches, and it will be appreciated that track-cache mapping 28 enables system 10 to implement the even and fine spread, and thus the well-balanced loading. For example, if in all-to-all configuration 11, or in one-to-one configuration 13, caches 20 comprise substantially equal capacities, it will be apparent that well-balanced loading occurs. Thus, referring back to mapping (1), statistical considerations make it clear that the average IO transaction related with the LAs of $LU_0$ is likely to use evenly all the 16 caches available in the system, rather than any one of them, or any subset of them, in particular. This is because $LU_0$ contains about 1.5 million tracks, and these tracks are now spread uniformly and finely across all 16 caches, thus yielding a well-balanced load for the IO activity pertaining to the caches, as may be true in general for any system where the number of tracks is far greater than the number of caches. Similarly, spreading LAs evenly and sufficiently finely amongst disks 12 leads to well-balanced IO activity for the disks.

An example of a configuration with unequal cache capacities is described with reference to FIG. 4.

Figure 4:
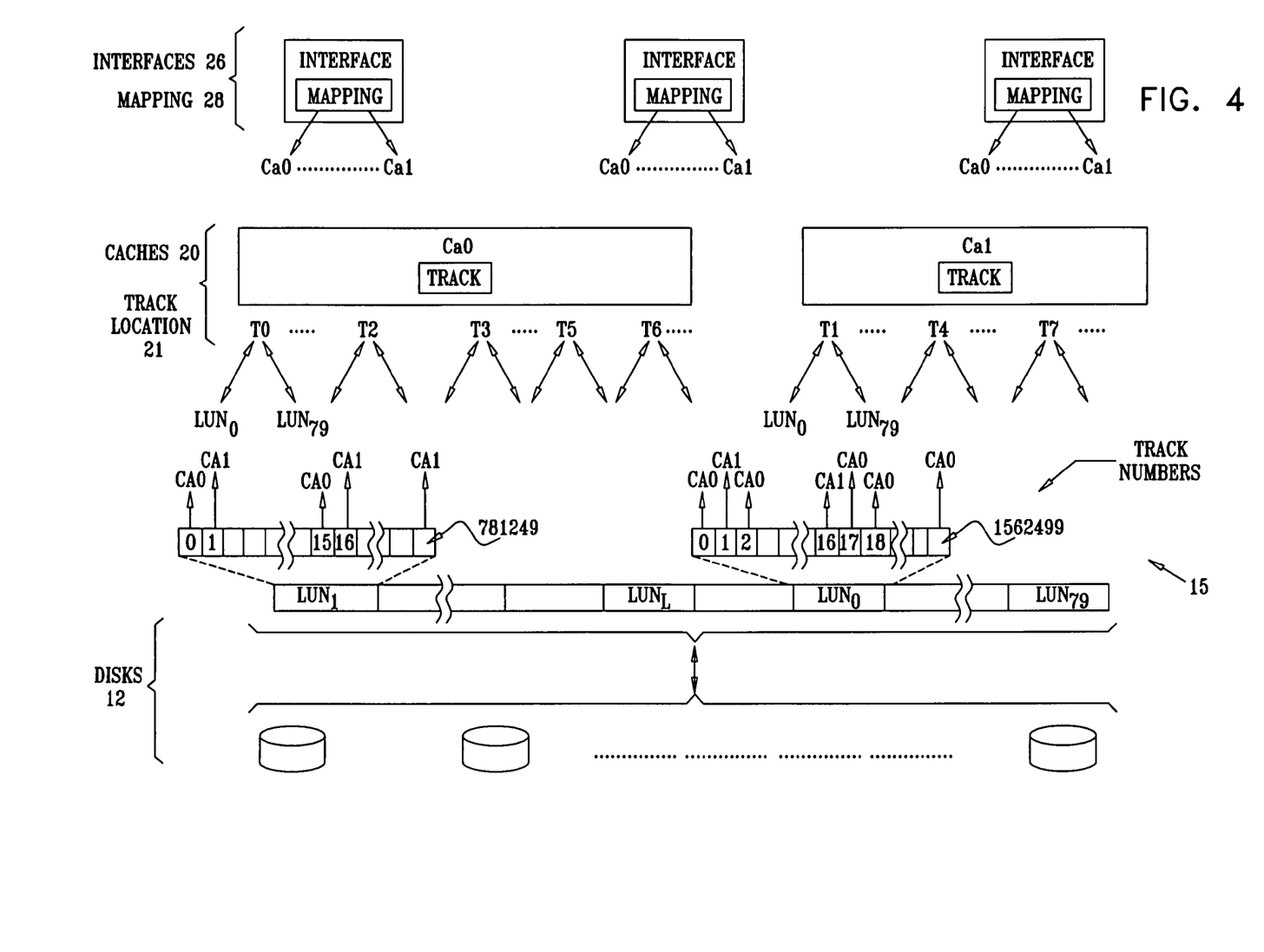
FIG. 4 is a schematic diagram illustrating a mapping of data between different elements of the system of FIG. 1 for an alternative "all-caches-to-all-disks" configuration, according to an embodiment of the present invention.

FIG. 4 is a schematic diagram illustrating a mapping of data between different elements of system 10 when the system comprises an alternative all-to-all configuration 15, according to an embodiment of the present invention. Apart from the differences described below, configuration 15 is generally similar to configuration 11, so that elements indicated by the same reference numerals in both configurations are generally identical in construction and in operation. All-to-all configuration 15 comprises two caches 20, herein termed Ca0 and Ca1, Ca0 having approximately twice the capacity of Ca1.

Trace-cache mapping 28 is implemented as mapping (6) below, or as Table V below, which is derived from mapping (6).

$$Tr(L,n) \rightarrow Ca[(n \bmod 3) \bmod 2] \qquad (6)$$

where n is the track number of $LU_L$.

TABLE V

| L (LU identifier) | Track n (Track number) | Cache (0-1) |
|---|---|---|
| 0 | 0 | 0 |
| 0 | 1 | 1 |
| 0 | 2 | 0 |
| 0 | 3 | 0 |
| 0 | 4 | 1 |
| 0 | 5 | 0 |
| 0 | 6 | 0 |
| . | . | . |
| . | . | . |
| . | . | . |
| 0 | 15 | 0 |
| 0 | 16 | 1 |
| 0 | 17 | 0 |
| 0 | 18 | 0 |
| . | . | . |
| . | . | . |
| . | . | . |
| 0 | 1562499 | 0 |
| 1 | 0 | 0 |
| 1 | 1 | 1 |
| . | . | . |
| . | . | . |
| . | . | . |
| 1 | 15 | 0 |
| 1 | 16 | 1 |
| 1 | 17 | 0 |
| . | . | . |
| . | . | . |
| . | . | . |
| 1 | 781249 | 1 |
| . | . | . |
| . | . | . |
| . | . | . |

Mapping 28 is configured to accommodate the unequal capacities of Ca0 and Ca1 so that well-balanced loading of configuration 15 occurs.

By inspection of the exemplary mappings for configurations 11, 13, and 15, it will be appreciated that mapping 28 may be configured to accommodate caches 20 in system 10 having substantially any capacities, so as to maintain substantially well-balanced loading for the system. It will also be appreciated that the loading generated by mapping 28 is substantially independent of the capacity of any specific disk in system 10, since the mapping relates caches to tracks.

Figure 5:
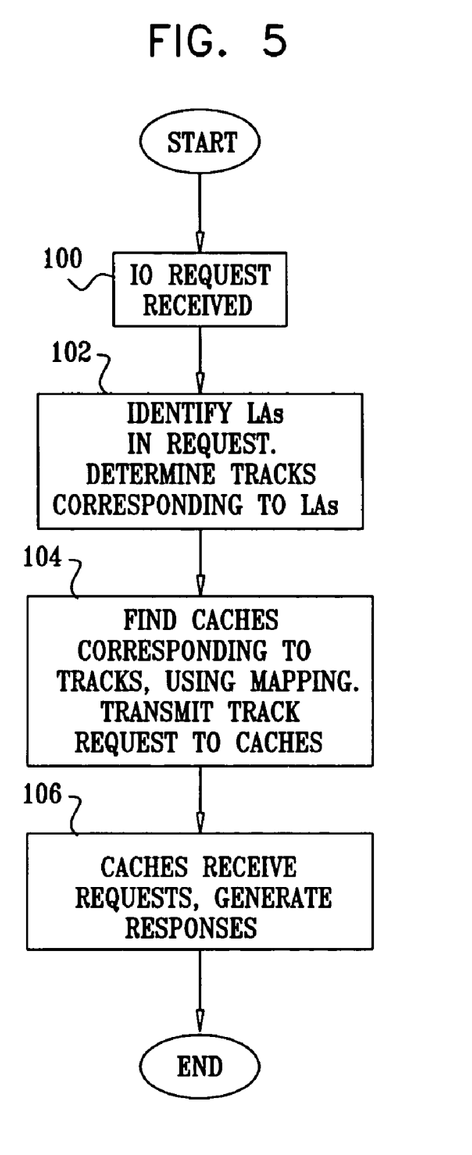
FIG. 5 is a flow chart showing steps followed by the system of FIG. 1 on receipt of an input/output request from a host communicating with the system, according to an embodiment of the present invention.

FIG. 5 is a flow chart showing steps followed by system 10 on receipt of an IO request from one of hosts 52, according to an embodiment of the present invention. Each IO request from a specific host 52 comprises several parameters, such as whether the request is a read or a write command, the LU to which the request is addressed, the first LA requested, and a number of blocks of data included in the request.

In an initial step 100, the IO request is transmitted to system 10 in one or more packets according to the protocol under which the hosts and the system are operating. The request is received by system 10 at one of interfaces 26, herein, for clarity, termed the request-receiving interface (RRI).

In a track identification step 102, the RRI identifies from the request the LAs from which data is to be read from, or to which data is to be written to. The RRI then determines one or more tracks corresponding to the LAs which have been identified.

In a cache identification step 104, the RRI refers to its mapping 28 to determine the caches corresponding to tracks determined in the third step. For each track so determined, the RRI transfers a respective track request to the cache corresponding to the track. It will be understood that each track request is a read or a write command, according to the originating IO request.

In a cache response 106, each cache 20 receiving a track request from the RRI responds to the request. The response is a function of, inter alia, the type of request, i.e., whether the track request is a read or a write command and whether the request is a "hit" or a "miss." Thus, data may be written to the LA of the track request from the cache and/or read from the LA to the cache. Data may also be written to the RRI from the cache and/or read from the RRI to the cache. If system 10 comprises an all-to-all configuration, and the response includes writing to or reading from the LA, the cache uses its track location table 21 to determine the location on the corresponding disk of the track for the LA.

The flow chart of FIG. 5 illustrates that there is virtually no management activity of system 10 once an IO request has reached a specific interface 26. This is because the only activity performed by the is, as described above for steps 102 and 104, identifying track requests and transmitting the track requests to their respective caches 20. Similarly, each cache 20 operates substantially independently, since once a track request reaches its cache, data is moved between the cache and the interface originating the request, and between the cache and the required disk, as necessary, to service the request.

Figure 6:
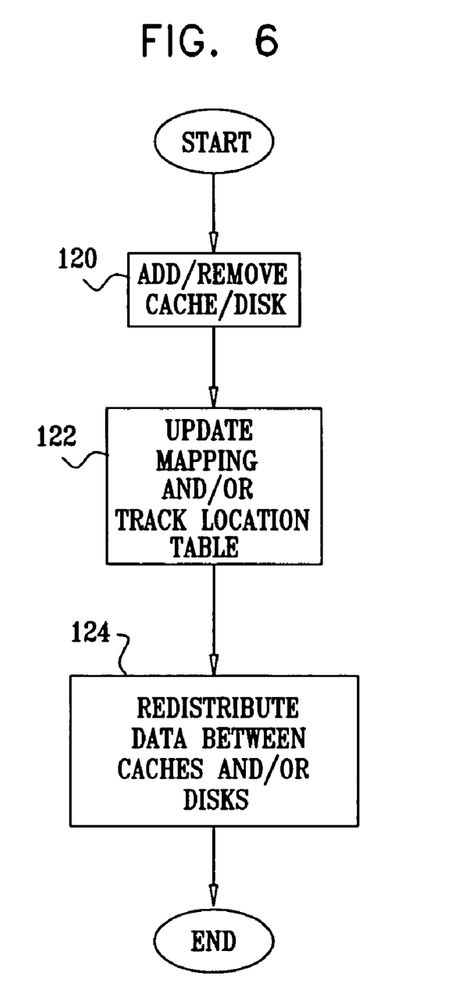
FIG. 6 is a flow chart showing steps followed by the system of FIG. 1 on addition or removal of a cache or disk to/from the system, according to an embodiment of the present invention.

FIG. 6 is a flow chart showing steps followed by system 10 on addition or removal of a cache or disk from system 10, according to an embodiment of the present invention. In a first step 120, a cache or disk is added or removed from system 10. In an update step 122, system manager 54 updates mapping 28 and/or track location table 21 to reflect the change in system 10. In a redistribution step 124, system manager 54 redistributes data on disks 12, if the change has been a disk change, or data between caches 20, if the change is a cache change. The redistribution is according to the updated mapping 28, and it will be understood that the number of internal IO transactions generated for the redistribution is dependent on changes effected in mapping 28. Once redistribution is complete, system 10 then proceeds to operate as described with reference to FIG. 4. It will thus be apparent that system 10 is substantially perfectly scalable.

Referring back to FIGS. 1, 2, and 3, redundancy for caches 20 and/or disks 12 may be easily incorporated into system 10. The redundancy may be implemented by modifying track-cache mapping 28 and/or track location table 21, so that data is written to more than one cache 20, and may be read from any of the caches, and also so that data is stored on more than one disk 12.

Mapping (7) below is an example of a mapping, similar to mapping (4), that assigns each track to two caches 20 of the 16 caches available, so that incorporating mapping (7) as track-cache mapping 28 in each interface 26 will form a redundant cache for each cache of system 10.

$$Tr(L, n) \rightarrow \begin{cases} Ca(n \bmod 8) \\ Ca(7 + n \bmod 8) \end{cases} \quad (7)$$

In processing an IO request, as described above with reference to FIG. 5, the interface 26 that receives the IO request may generate a track request (cache identification step 104) to either cache defined by mapping (7).

Table VI below is an example of a table for cache Ca7, similar to Table III above, that assumes each track is written to two separate disks 12, thus incorporating disk redundancy into system 10. The specific disk locations for each track are assigned by system manager 54. A table similar to Table VI is incorporated as track location table 21 into each respective cache 20.

TABLE VI

| Cache Ca7 | | |
|---|---|---|
| Track | | |
| L (LU identifier) | n (Track number) | Disk Location |
| 0 | 7 | a1, a2 |
| 0 | 23 | b1, b2 |
| . | . | . |
| . | . | . |
| . | . | . |
| 0 | 1562487 | c1, c2 |
| 1 | 7 | d1, d2 |
| 1 | 23 | e1, e2 |
| . | . | . |
| . | . | . |
| 1 | 1562487 | f1, f2 |
| . | . | . |
| . | . | . |

As described above with reference to cache response step 106 (FIG. 5), the cache that receives a specific track request may need to refer to track location table 21. This reference generates a read or a write, so that in the case of Table VI, the read may be to either disk assigned to the specific track, and the write is to both disks.

It will be appreciated that other forms of redundancy known in the art, apart from those described above, may be incorporated into system 10. For example, a write command to a cache may be considered to be incomplete until the command has also been performed on another cache. All such forms of redundancy are assumed to be comprised within the present invention.

Figure 7:
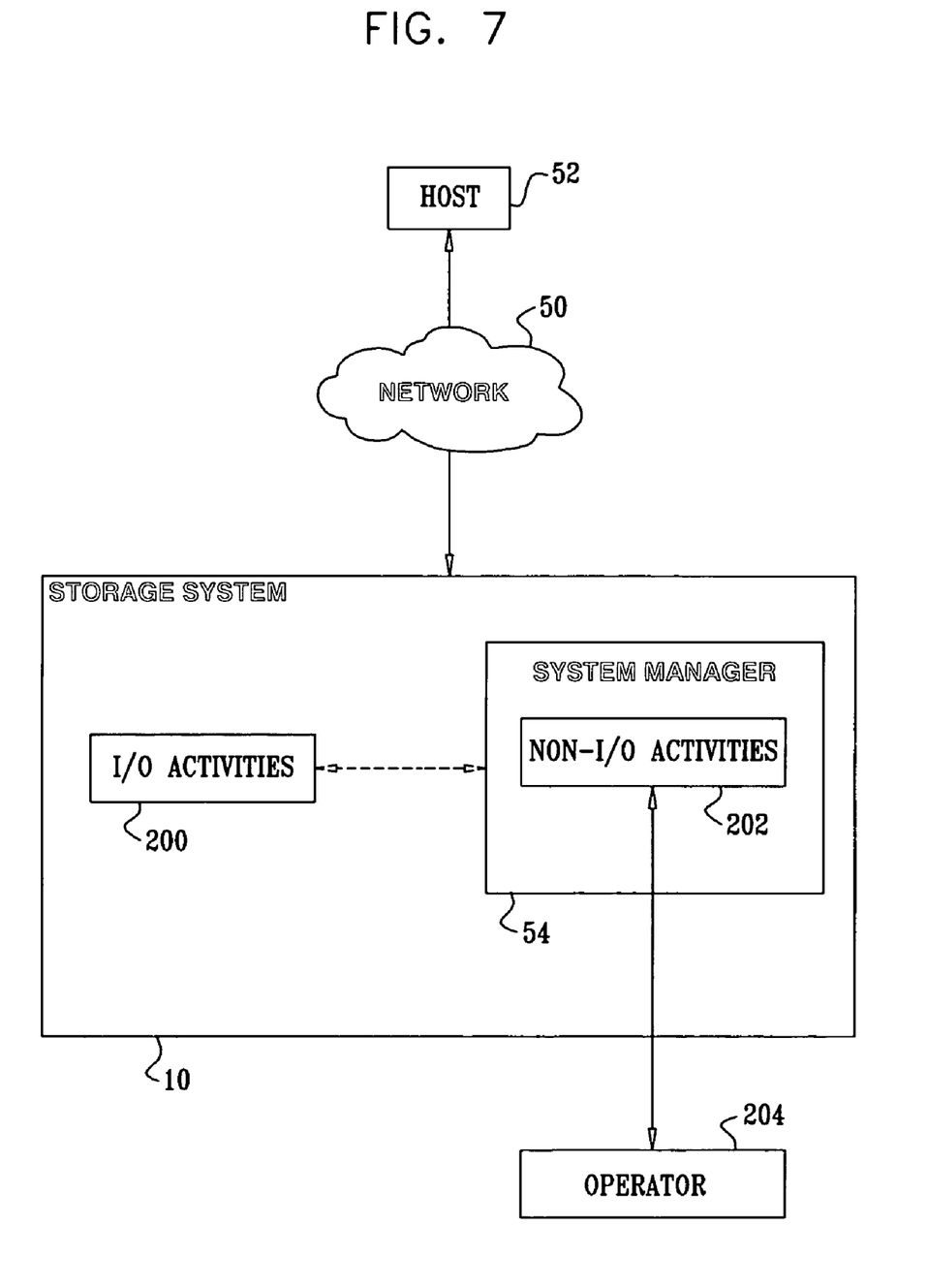
FIG. 7 is a block diagram illustrating functions performed by a system manager of the data storage system of FIG. 1, according to an embodiment of the present invention.

FIG. 7 is a block diagram illustrating functions performed by system manager 54, according to an embodiment of the present invention. Manager 54 at least partly manages and at least partly implements non-I/O activities 202, comprising activities performed during the course of operation of system 10 which involve interaction, or the expectation of an interaction, between operator 204 and system 10. The expectation of an interaction typically comprises an action by system 10, such as an automatic display of information to operator 204, which is intended to be responded to by the operator, possibly at some time after the system action. Such non-I/O activities are also referred to herein as operator interactions.

Non-I/O activities 202 also comprise autonomous activities taken by system 10, such autonomous activities typically comprising activities internal to the system which do not require an operator interaction, and which are unrelated to any protocol under which system 10 operates as part of its interaction with the host. Examples of autonomous system activities include automatic shut-down of system 10, (which may typically occur in the event of a long-term power failure), automatic re-configuration of a topology of the system, (typically in the event of a partial failure of a component of the system), periodical monitoring of certain parameters to be sent to the operator, and scheduling the launching of backup activity.

The management of any specific operator interaction typically comprises internal checks, by a PU performing the activity, that aspects of the activity have been correctly performed.

In some embodiments of the present invention, manager 54 may at least partially perform I/O activities 200, as indicated by the broken line in FIG. 7. Functions covered by I/O activities 200 comprise input requests for reading or writing of data from hosts 52, transfer of the requests between interfaces 26, caches 20, and disks 12, as well as transfer of data being written or read between hosts 52 and system 10.

Figure 8:
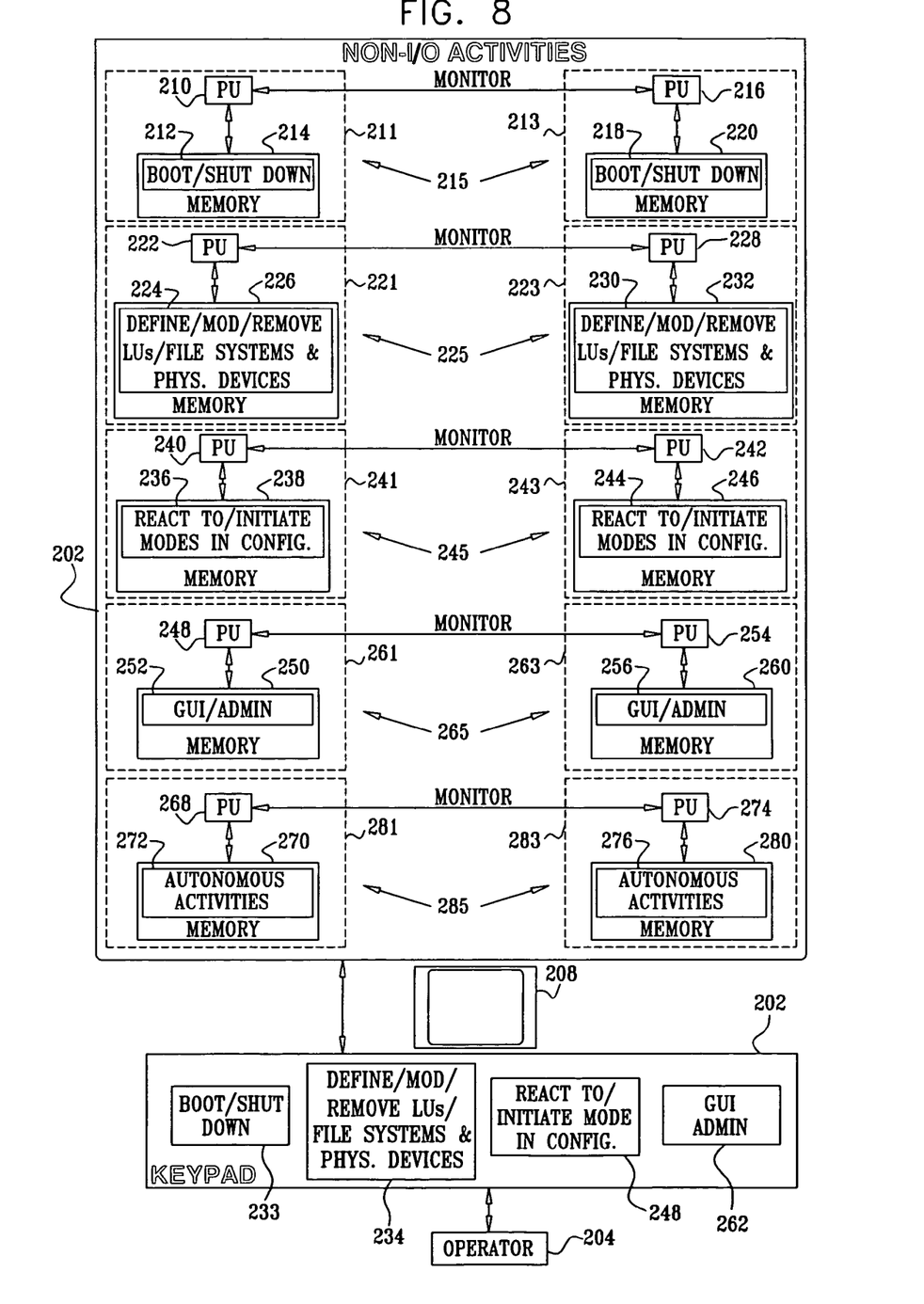
FIG. 8 is a block diagram illustrating elements involved in non-input/output (I/O) activities, according to an embodiment of the present invention.

FIG. 8 is a block diagram illustrating elements involved in non-I/O activities 202, according to an embodiment of the present invention. In order to perform functions comprised in non-I/O activities 202, operator 204 communicates with storage system 10, typically via a monitor 208 and a keypad 206 which allow the storage system and the operator to interact.

Non-I/O activities 202 are implemented in storage system 10 in a fully redundant manner. In order to fulfil the redundancy, and as described in more detail below, both software and hardware elements used in performing the non-I/O activities are at least duplicated, so that a failure of any one of the elements does not affect the ability to perform the non-I/O activities. Specifically, two or more processing systems which are able to perform each operator interaction are implemented in system 10. The two or more processing systems for each non-I/O activity are also referred to hereinbelow as a redundant combination.

In an embodiment of the present invention, the two or more processing systems for a specific operator interaction are configured to share the tasks involved in performing the interaction, as well as to monitor each others activity. In this configuration, all processing systems are "active," and such a configuration is termed an "active-active" configuration. In the event of a failure of one of the active systems, the remaining active system or systems take over the tasks performed by the failed system.

In an alternative embodiment of the present invention, one active system, of the two or more processing systems for a specific operator interaction, is configured to perform the tasks involved in the interaction. The remaining system or systems are configured as "passive" systems, which do not perform tasks required by the operator interaction while the active system is functioning correctly. Such a configuration is termed an "active-passive" configuration. At least one of the passive systems monitors the operation of the active system. In the event of a failure of the active system, one or more of the passive systems take over the tasks performed by the failed system.

For clarity, unless otherwise stated, the redundant management system described herein is assumed to be configured as an active-passive system. However, it will be appreciated that the description, *mutatis mutandis*, also applies to an active-active system.

In the following description for FIG. 8, unless otherwise stated it is assumed that each processing system comprises a processing unit coupled to a respective memory, the memory comprising software enabling the processing unit to perform the non-I/O activity of the processing system. (FIG. 9, and its associated description, is illustrative of examples of alternative methods for implementing the redundant combinations.) For clarity, each non-I/O activity redundant combination described with reference to FIG. 8 is assumed to comprise two processing systems; it will be appreciated, however, that any of the redundant combinations may comprise more than two processing systems, so that in the event of a failure of one of the systems, full redundancy of the non-I/O activity may be maintained.

For each operation interaction, the processing systems comprised within each specific redundant combination monitor each other for occurrence of a failure. In the event of a failure in one of the processing systems of a combination, another of the processing systems of the combination takes over, the other processing system being activated to perform the interaction. It will be appreciated that the process of another processing system taking over performance of the activity may comprise at least partly de-activating the system wherein the failure has occurred, if the failure has not caused such a de-activation.

A first boot/shut down software 212 is stored in a memory 214 which is accessed by a processing unit 210. A second boot/shut down software 218 is stored in a memory 220 which is accessed by a processing unit 216. Software 212, memory 214, and unit 210 form a first boot/shut down processing system 211. Software 218, memory 220, and unit 216 form a second boot/shut down processing system 213. A boot/shut-down redundant combination 215 comprises processing systems 211 and 213.

Most preferably, both memory 214 and memory 220 comprise non-volatile memories, such as read only memories (ROMs) and/or disks. Softwares 212 and 218 both comprise bootstrap loader programs and the operating systems which the respective loader programs read into random access memories (RAMs). Boot/shut down softwares 212 and 218 are substantially similar, and the tasks performed by these softwares comprise both "cold" and "warm" boots. Operator 204 may choose, according to circumstances, to perform a cold or a warm boot.

Softwares 212 and 218 also both comprise substantially similar shut down procedures, enabling operator 204 to safely close all files and applications running on system 10, and to log out, so that system 10 may be safely powered down.

Typically, operator 204 performs a boot or a shut down of system 10 by invoking a default boot/shut down processing system, herein assumed to be system 211, via keypad 206 and/or monitor 208 and boot/shut down controls 233 therein. During operation of system 211, system 213 monitors system 211, and in the event of a failure of system 211, system 213 takes over the boot or shut down activity.

A first define/modify/remove software 224 is stored in a memory 226 which is accessed by a processing unit 222. A second define/modify/remove software 230, substantially similar to software 224, is stored in a memory 232 which is accessed by a processing unit 228. Memories 226 and 232 typically comprise volatile random access memory (RAM) to which software 224 and 230 are respectively written during booting of system 10. A first define/modify/remove processing system 221 comprises software 224, memory 226, and unit 222. Software 230, memory 232, and unit 228 form a second define/modify/remove processing system 223. Processing systems 221 and 223 form a define/modify/remove redundant combination 225.

Softwares 224 and 230 enable operator 204 to define, modify, and/or remove a logical unit (LU), a file system, and/or a physical element of system 10. For example, the softwares enable the operator to increase the amount of memory allocated to a specific LU by adding a disk 12 to system 10. Softwares 224 and 230 operate via controls 234 comprised in monitor 208 and keypad 206, and the softwares themselves may be implemented to partly or completely define the controls. Such controls comprise part of a graphical user interface (GUI) of system 10, and are well known in the art.

Operator 204 typically performs the activities of softwares 224 or 230 by invoking a default define/modify/remove processing system, herein assumed to be system 221, via keypad 206 and/or monitor 208 and define/modify/remove controls 234. During operation of system 221, system 223 monitors system 221, and in the event of a failure of system 221, system 223 takes over the define/modify/remove activity.

A first change configuration software 236 is stored in a memory 238 which is accessed by a processing unit 240. A second change configuration software 244, substantially similar to software 236, is stored in a memory 246 which is accessed by a processing unit 242. Software 236, memory 238, and unit 240 form a first change configuration processing system 241. Software 244, memory 246, and unit 242 form a second change configuration processing system 243. A change configuration redundant combination 245 comprises processing systems 241 and 243.

Memories 238 and 246 typically comprise RAM to which the softwares are written during booting of system 10. Controls 248 in monitor 208 and keypad 206 allow operator 204 to implement functions determined by the change configuration software, and the softwares may be implemented to at least partly define the controls.

Change configuration softwares 236 and 244 allow operator 204 to react to and/or initiate modifications of the configuration of system 10. Such modifications may occur, for example, in the case of an addition or removal of one of the elements of the system. The modifications may also be implemented to allow the operator to make a change in configuration by internal rearrangement of the elements of the system. For example, the softwares are most preferably enabled to allow the operator to change at least some of the disks and caches of a system which has been configured to operate in an all-to-all configuration, as described above with respect to FIG. 1, to a one-to-one configuration, corresponding to the configuration of FIG. 3.

Change configuration combination 245 enables operator 204 to change the configuration of system 10 by invoking a default system of the combination, herein assumed to be system 241. Substantially as described above with reference to redundant combinations 215 and 225, during operation of system 241, system 243 monitors system 241, and takes over the change configuration activity in the event of a failure in system 241.

A first graphic user interface (GUI)/administration software 252 is stored in a memory 250 which is accessed by a processing unit 248. A second GUI/administration software 256, substantially similar to software 252, is stored in a memory 260 which is accessed by a processing unit 254. Memories 250 and 260 typically comprise RAM. Software 252, memory 250, and unit 248 form a first GUI/administration processing system 261. Software 256, memory 260, and unit 254 form a second GUI/administration processing system 243. A GUI/administration redundant combination 265 comprises processing systems 261 and 263.

Controls 262 of monitor 208 and keypad 206 allow operator 204 to implement functions determined by the GUI/administration software. Softwares 252 and 256 may also be implemented to at least partly define the controls.

Softwares 252 and 256 enable operator 204 to change how an interface used on monitor 208 appears to the operator, including such variables as exactly which information about system 10 is presented, how the information is presented, and how actions by the operator may be applied to the system. The softwares also enable operator 204 to administer system 10, by providing to the operator statistics on operation of the various elements of the system, as well as providing details on the configuration of the various elements. Such statistics may include values which track numbers and/or rates of accesses to disks and/or caches of the system. In the case of the caches the statistics most preferably include fractions of I/O requests which are "hits;" in the case of the disks the statistics typically include fractions of disks which are used/available.

Combination 265 enables operator 204 to alter the GUI of system 10, and also to administer the system, by invoking a default processing system of the combination, herein assumed to be system 261. Substantially as described above, system 263 monitors the operation of system 261, and takes over the GUI/administration activity in the event of a failure in system 261.

A first autonomous activities software 272 is stored in a memory 270 which is accessed by a processing unit 268. A second autonomous activities software 276, substantially similar to software 272, is stored in a memory 280 which is accessed by a processing unit 274. Memories 270 and 280 typically comprise RAM. Software 272, memory 270, and unit 268 form a first autonomous activities processing system 281. Software 276, memory 280, and unit 274 form a second autonomous activities processing system 263. An autonomous activities redundant combination 285 comprises processing systems 281 and 283.

Softwares 272 and 276 enable system 10 to perform autonomous activities of the system, such as are exemplified above, and combination 285 enables the system to perform the autonomous activities by invoking a default processing system of the combination, herein assumed to be system 281. Substantially as described above, system 283 monitors the operation of system 281, and takes over the autonomous activities in the event of a failure in system 281.

As described above, each default system is monitored for failure during the course of its operation. It will be understood that the monitoring may take substantially any appropriate form known in the art. For example, the monitoring may comprise self-checks by the default system, the failure of one of these self-checks triggering operation of a non-default processing system. It will also be understood that the monitoring is most preferably performed on the integrity of both the processing unit and the memory of a processing system, as well as on the results of operations performed by the processing system.

Figure 9:
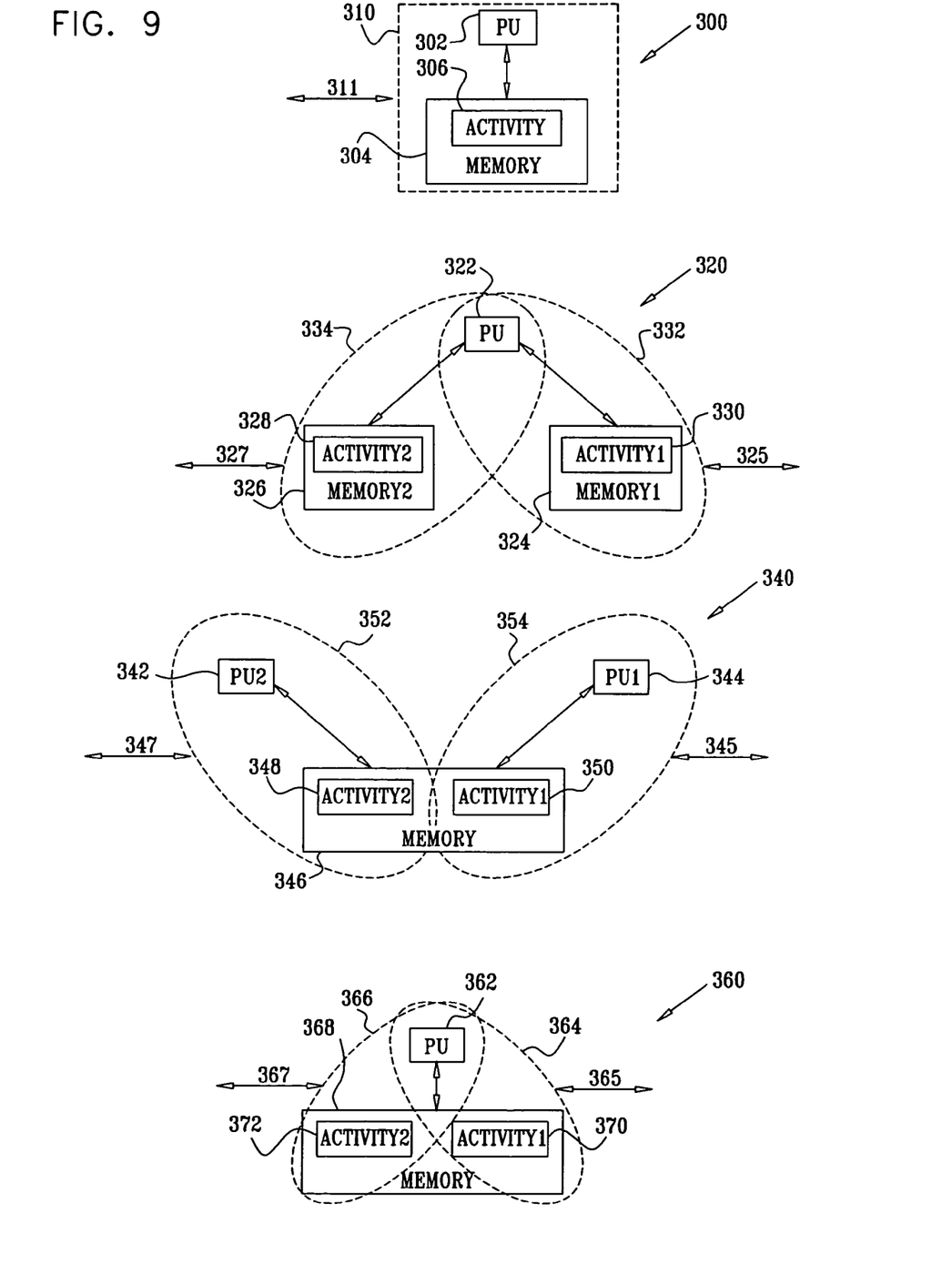
FIG. 9 is a schematic diagram illustrating configurations of non-I/O activity processing systems, according to an embodiment of the present invention.

FIG. 9 is a schematic diagram illustrating configurations of non-I/O activity processing systems, according to an embodiment of the present invention. A configuration 300 comprises a dedicated PU 302 which communicates with a dedicated memory 304. Non-I/O activity software 306 is written to the memory. PU 302, memory 304, and software 306 form a processing system 310. Processing system 310 is one of the systems of a redundant combination 311, but for clarity the one or more other systems of the redundant combination are not shown. Configuration 300 is an example of the configurations of the processing systems described with respect to FIG. 8.

A configuration 320 comprises a PU 322 which communicates with a first memory 324 and a second memory 326. A first non-I/O activity software 330 is written to memory 324. A second non-I/O activity software 328 is written to memory 326. A first processing system 332 comprises PU 322, memory 324 and software 330; a second processing system 334 comprises PU 322, memory 326 and software 328. Processing system 332 is one of the systems of a redundant combination 325, and processing system 334 is one of the systems of a redundant combination 327. (For clarity, the other systems of combinations 325 and 327 are not shown.) Configuration 320 is an example of processing systems formed from one processing unit communicating with two or more memories.

Failure of processing system 332 requires activation of another system of combination 325. Depending on the failure, failure of processing system 332 may or may not require activation of another system of combination 327. For example, if the failure is determined to be in memory 324, and the integrity of system 334 is unaffected, there may be no need de-activate system 334 and activate another system of combination 327. Conversely, if the failure is in PU 322, systems 332 and 334 need to be de-activated if this is not already the case due to the failure, and activation of the other systems of combinations 325 and 327 is required.

A configuration 340 comprises a first PU 344 and a second PU 342 which communicate with a single memory 346. A first non-I/O activity software 350 and a second non-I/O activity software 348 are written to memory 346. A first processing system 354 comprises PU 344, memory 346 and software 350; a second processing system 352 comprises PU 342, memory 346 and software 348. Processing system 354 is one of the systems of a redundant combination 345, and processing system 352 is one of the systems of a redundant combination 347. Configuration 340 is an example of processing systems formed from two or more processing units communicating with a single memory.

Failure of processing system 354 requires activation of another system of combination 345. The failure may or may not require activation of another system of combination 347, depending on which element of system 354 has failed.

A configuration 360 comprises a PU 362 which communicates with a single memory 368. A first non-I/O activity software 370 and a second non-I/O activity software 372 are written to memory 368. A first processing system 364 comprises PU 362, memory 368 and software 370; a second processing system 366 comprises PU 362, memory 368 and software 372. Processing system 364 is one of the systems of a redundant combination 365, and processing system 366 is one of the systems of a redundant combination 367. Configuration 360 is an example of processing systems formed from a single processing unit communicating with a single memory, the latter having two or more non-I/O softwares written therein.

Failure of processing system 364 requires activation of another system of combination 365. The failure typically also requires activation of another system of combination 367, unless the failure is only in software 370.

It will be appreciated that tasks referred to hereinabove as being performed by a specific processing unit may be performed by two or more processing units operating together. Such processing units may be implemented in a distributed or non-distributed configuration. Similarly, memories wherein the software for the specific non-I/O activities is stored may also be implemented in a distributed or non-distributed configuration. It will also be appreciated that a processing unit which performs or is adapted to perform tasks of a particular non-I/O activity may be implemented to perform tasks other than those required for the non-I/O activity, such as interaction with an operating system software of system 10, or an I/O activity.

A data storage system typically comprises one or more interfaces coupled to external hosts, mass storage non-volatile media such as disks, and caches which are coupled between the one or more interfaces and the mass storage media. While the embodiments described above have referred to specific configurations of interfaces, caches, and non-volatile storage devices, it will be appreciated that the scope of the present invention includes all storage systems comprising interfaces, caches and non-volatile storage devices.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for managing a storage system including a plurality of caches coupled to a plurality of disks, comprising:
   addressing data in a uniform, fine address pace of data tracks, the data tracks having respective data tack numbers;
   forming a mapping of the data tracks to the disks by hashing a modulus of the data track numbers;
   configuring a system manager of the storage system to comprise a first distributed management processing system and a second distributed management processing system sharing a first common system element, and a third distributed management processing system and a fourth distributed management processing system sharing a second common system element, each of the first, the second, the third, and the fourth distributed management processing systems being configured to perform an operator interaction with the storage system, the first and the second distributed management processing systems being configured to check each other for failure, and the third and the fourth distributed management processing systems being configured to check each other for failure;
   detecting, by the system manager, a failure in the first common system element; and
   remapping only the data tracks mapped to the first common system element to the third or the fourth distributed management processing system, using at least one of the first or the second management processing systems to perform the remapping, so as to update the mapping to an updated mapping.

2. The method of claim 1, the method farther comprising:
   coupling interfaces, that transfer data from hosts of the storage system, to the caches;
   configuring the system manager to have farther distributed management processing systems, so that a total number of the distributed management processing systems equals a number of the interfaces and the caches; and
   respectively installing the total number of the distributed management processing systems on the interfaces and the caches, and running the distributed management processing systems thereon.

3. The method of claim 1, the method farther comprising:
   coupling interfaces, that transfer data from hosts of the storage system, to the caches;
   configuring the system manager to have farther distributed management processing systems, so that a total number of the distributed management processing systems is less than a number of the interfaces and the caches; and installing respective distributed management processing systems on an equal number of interfaces and the caches, and running the distributed management processing systems thereon.

4. The method according to claim 1, wherein the respective mapping comprises a function.

5. The method according to claim 1, wherein the respective mapping comprises a lookup table.

6. The method according to claim 1, wherein performing the remapping comprises performing the remapping using only the first management processing system.

7. The method according to claim 1, wherein performing the remapping comprises performing the remapping using the first management processing system and the second management processing system.

8. The method according to claim 1, wherein performing the remapping comprises the at least one management processing system redistributing the data tracks one track at a time in response to the updated mapping.

9. A hardware configuration in a computing system, comprising:
   a first configuration comprising:
      a first processing system configured to perform a first activity, the first processing system comprising a first processor unit and a first memory, and
      a second processing system configured to perform a second activity, the second processing system comprising the first processor unit and a second memory; and
   a second configuration in communication with the first configuration, the second configuration comprising:
      a third processing system configured to perform the first activity, the third processing system comprising a second processor unit and a third memory, and
      a fourth processing system configured to perform the second activity, the fourth processing system comprising the second processor unit and a fourth memory.

10. The hardware configuration of claim 9, wherein the first processing system is configured to:
    detect a first failure in the second processing system while the second processing system is actively performing the second activity; and
    de-activate the second processing system and activate the fourth processing system such that the fourth processing system begins performing the second activity.

11. The hardware configuration of claim 10, wherein the first processing system is further configured to:
    detect a second failure in the first processing system while the first processing system is actively performing the first activity; and
    de-activate the first processing system and activate the third processing system such that the third processing system begins performing the first activity.

12. The hardware configuration of claim 11, wherein the second processing system is configured to:
    detect a third failure in the fourth processing system while the fourth processing system is actively performing the second activity; and
    de-activate the fourth processing system and activate the second processing system such that the second processing system begins performing the second activity.

13. The hardware configuration of claim 12, wherein the second processing system is further configured to:
    detect a fourth failure in the third processing system while the third processing system is actively performing the first activity; and
    de-activate the third processing system and activate the first processing system such that the first processing system begins performing the first activity.

14. A hardware configuration in a computing system, comprising:
    a first configuration comprising:
       a first processing system configured to perform a first activity, the first processing system comprising a first processor unit and a first memory, and
       a second processing system configured to perform a second activity, the second processing system comprising a second processor unit and the first memory; and
    a second configuration in communication with the first configuration, the second configuration comprising:
       a third processing system configured to perform the first activity, the third processing system comprising a third processor unit and a second memory, and
       a fourth processing system configured to perform the second activity, the fourth processing system comprising a fourth processor unit and the second memory.

15. The hardware configuration of claim 14, wherein the first processing system is configured to:
    detect a first failure in the second processing system while the second processing system is actively performing the second activity; and
    de-activate the second processing system and activate the fourth processing system such that the fourth processing system begins performing the second activity.

16. The hardware configuration of claim 15, wherein the first processing system is further configured to:
    detect a second failure in the first processing system while the first processing system is actively performing the first activity; and
    de-activate the first processing system and activate the third processing system such that the third processing system begins performing the first activity.

17. The hardware configuration of claim 16, wherein the second processing system is configured to:
    detect a third failure in the fourth processing system while the fourth processing system is actively performing the second activity; and
    de-activate the fourth processing system and activate the second processing system such that the second processing system begins performing the second activity.

18. The hardware configuration of claim 17, wherein the second processing system is further configured to:
    detect a fourth failure in the third processing system while the third processing system is actively performing the first activity; and
    de-activate the third processing system and activate the first processing system such that the first processing system begins performing the first activity.

* * * * *

UNITED STATES PATENT AND TRADEMARK OFFICE
CERTIFICATE OF CORRECTION

PATENT NO. : 7,603,580 B2
APPLICATION NO. : 10/886359
DATED : October 13, 2009
INVENTOR(S) : Zohar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Fifth Day of October, 2010

David J. Kappos
*Director of the United States Patent and Trademark Office*